United States Patent
Park et al.

(10) Patent No.: US 11,308,408 B2
(45) Date of Patent: Apr. 19, 2022

(54) FAULT SIGNAL RECOVERY SYSTEM AND METHOD

(71) Applicant: Doosan Heavy Industries & Construction Co., LTD, Changwon-si (KR)

(72) Inventors: Jee Hun Park, Gwangmyeong-si (KR); Hyun Sik Kim, Gimpo-si (KR)

(73) Assignee: Doosan Heavy Industries & Constructon Co., LTD, Gyeongsangnam-do (KR)

(*) Notice: Subject to any disclaimer, the term of this patent is extended or adjusted under 35 U.S.C. 154(b) by 570 days.

(21) Appl. No.: 15/949,364

(22) Filed: Apr. 10, 2018

(65) Prior Publication Data
US 2018/0330255 A1 Nov. 15, 2018

(30) Foreign Application Priority Data
May 15, 2017 (KR) .......................... 10-2017-0059962

(51) Int. Cl.
| | |
|---|---|
| *G06N 5/04* | (2006.01) |
| *G06N 20/00* | (2019.01) |
| *G06N 20/20* | (2019.01) |
| *G01M 99/00* | (2011.01) |
| *G06F 11/00* | (2006.01) |

(52) U.S. Cl.
CPC ............ *G06N 5/047* (2013.01); *G01M 99/00* (2013.01); *G06F 11/00* (2013.01); *G06N 20/00* (2019.01); *G06N 20/20* (2019.01)

(58) Field of Classification Search
CPC ........ G06N 5/047; G06N 20/20; G06N 20/00; G06N 99/005; G01M 99/00; G06F 11/3089; G06F 11/0751; G06F 11/3055; G06F 11/3058; G06F 11/3013; G06F 11/00; G06F 2201/805
See application file for complete search history.

(56) References Cited

U.S. PATENT DOCUMENTS

| | | | |
|---|---|---|---|
| 7,080,290 B2* | 7/2006 | James ..................... | G05B 17/02 702/179 |
| 2012/0041575 A1* | 2/2012 | Maeda ................. | G05B 23/024 700/80 |
| 2012/0316835 A1* | 12/2012 | Maeda ..................... | G01D 3/08 702/183 |
| 2014/0258187 A1* | 9/2014 | Suleiman ............... | G06N 20/00 706/12 |

* cited by examiner

*Primary Examiner* — Alexander Satanovsky
*Assistant Examiner* — Lynda Dinh
(74) *Attorney, Agent, or Firm* — Foundation Law Group LLP; Kwang Jun Kang; J D Harriman

(57) ABSTRACT

Disclosed is a fault signal recovery system including a data processor configured to generate a signal subset U* by removing, from a signal set U for a plurality of tags, some tags including a fault signal, and a first learning signal subset X* by removing tags disposed at positions corresponding to the some tags from a learning signal set X containing only tags of normal signals, a modeling unit configured to generate feature information F extractable from the first learning signal subset X* and recovery information P on a plurality of recovery models usable for restoring the fault signal, and a recovery unit configured to select an optimum recovery model by matching the feature of the learning signal set X with the recovery models generated through the recovery in formation P to estimate and recover normal signals for the some tags.

12 Claims, 5 Drawing Sheets

FAULT SIGNAL RECOVERY SYSTEM AND METHOD

CROSS-REFERENCE TO RELATED APPLICATIONS

This application claims priority to Korean Patent Application No. 10-2017-0059962, filed on May 15, 2017, the disclosure of which is incorporated herein by reference in its entirety.

BACKGROUND OF THE SYSTEM

Field

The present system relates to a fault signal recovery system and method for collecting signals obtained by measuring signals from machinery in a plant and restoring a fault signal among the measurement signals, and more particularly, a fault signal recovery system and method for selecting an optimum recovery model.

Description of the Related Art

Generally, large plants such as power plants or chemical plants are operated with various kinds of machines and electric components in complex connection with each other. Such plants must constantly monitor signs of faults, which may lead to an accident, in order to secure reliability and supply power stably. Accordingly, a monitoring device configured to detect in real time, whether major components constituting the plant are damaged or not and to generate an alarm to the operator when signs of faults are found in the components has been introduced.

That is, failure of one or more components of a plant can cause damage to the plant, leading to undesirable performance. Further, if the plant breaks down, a person could be injured or killed and environmental problems may be raised. Therefore, an early warning system capable of early detection of faults is indispensable.

An early warning system that provides early indication of a failure or likelihood of a failure is required to receive and store real-time observation signals from the plant, and to identify a fault signal beforehand based on the stored signals using a failure prediction model capable of early failure prediction. The failure prediction model may accurately predict the normal state of the plant and predict occurrence of failure when an observation signal that is different from the normal state is input.

In order for the failure prediction model to operate as accurately as possible, good-quality teaming data is needed. In other words, accuracy of the failure prediction model may be improved by performing learning of a normal stale using good-quality learning data. Therefore, securing good-quality learning data is a priority for accurate failure prediction models. Although most observed signals are well suited as learning data, some sensors provide fault signals due to sensor failure or network problems as well as actual plant failure. Generally, data containing such a fault signal cannot be used as learning data. However, in some cases, it may be inappropriate to discard other good-quality data because of some fault signals. In this case, if the fault signals can be restored to the original normal signals, all data can be used as learning data.

Such fault signal recovery technology is considered as a technology that is essential for an early warning system. In addition, since signals recovered through the fault signal recovery technology can be used as learning data to construct a failure prediction model, performance of accurate recovery is needed to construct an accurate failure prediction model. However, accuracy of the fault signal recovery technology is still low, and thus there is a need for a technology to increase the accuracy.

SUMMARY

Therefore, the present system has been made in view of the above problems, and it is an object of the present system to provide a fault signal recovery system and method for extracting a feature of data to be recovered and generating an optimum recovery model by selecting a recovery model matching the feature of the data.

In accordance with an aspect of the present system, the above and other objects can be accomplished by the provision of a fault signal recovery system. The fault signal recovery system includes a data processor configured to generate a signal subset $U^*$ by removing, from a signal set U for a plurality of tags, some tags including a fault signal, and a first learning signal subset $X^*$ by removing tags disposed at positions corresponding to the some tags from a learning signal set X containing only tags of normal signals, a modeling unit configured to generate feature information F extractable from the first learning signal subset $X^*$ and recovery information F on a plurality of recovery models usable for restoring the fault signal, and a recovery unit configured to analyze a feature of the learning signal set X based on the feature information F and select an optimum recovery model by matching the feature of the learning signal set X with the recovery models generated through the recovery information P to estimate and recover normal signals for the some tags.

According to an embodiment, the recovery unit includes a pattern analyzer configured to analyze the feature of the learning signal set X based on the feature information F and extract information on the features, a model selector configured to select the optimum recovery model matching the feature of the learning signal set X from among the recovery models generated through the recovery information P, and an ensemble learning unit configured to generate an optimum recovery algorithm by generating a recovery value for the some tags by selecting an algorithm matching the optimum recovery model.

According to an embodiment, the optimum recovery model may include at least one model selected in each of a parametric model group and a nonparametric model group.

According to an embodiment, the model selector may select a plurality of recovery models in each of the parametric model group and the nonparametric group, wherein the model selector may select the optimum recovery model by setting weights for the plurality of recovery models based on the features of the learning signal set X.

According to an embodiment, the ensemble learning unit may select an algorithm to be applied to the optimum recovery model based on the weights, wherein the algorithm may be matched with a recovery model assigned a greater one of the weights set for the recovery models in generating the optimum recovery model.

According to an embodiment, the feature of the learning signal set X may include a plurality of features, wherein the model selector may select a plurality of the recovery models matched with the features of the learning signal set X, respectively.

According to an embodiment, the data processor may further generate a second learning signal subset Xs containing only signals for the some tags and the first learning signal subset X* containing only signals for the remaining tags other than the some tags by processing the learning signal set X.

According to an embodiment, the modeling unit may include a feature extractor configured to extract the feature information P extractable from the first learning signal subset X* received from the data processor, and a model generator configured to generate the recovery information P on the plurality of recovery models usable for restoring the fault signal based on the first learning signal subset X* and she second learning signal subset Xs received from the data processor and the feature information F.

In accordance with another aspect of the present system, provided is a fault signal recovery method. The method includes generating a signal subset U* by removing, from a signal set U for a plurality of tags, some tags including a fault signal, and a first learning signal subset X* by removing tags disposed at positions corresponding to the some tags from a learning signal set X containing only tags of normal signals, generating feature information F extractable from the first learning signal subset X* and recovery information P on a plurality of recovery models usable for restoring the fault signal, analyzing a feature of the learning signal set X based on the feature information F and selecting an optimum recovery model by matching the feature of the learning signal set X with the recovery models generated through the recovery information P, and estimating and recovering a normal signal for the some tags by applying an algorithm matching the optimum recovery model.

According to an embodiment, the selecting of the optimum recovery model may include selecting at least one recovery model in each of a parametric model group and a nonparametric model group and matching the same with the learning signal set X, the parametric model group and the nonparametric model group constituting the recovery information.

According to an embodiment, the selecting of the optimum recovery model may include selecting a plurality of recovery models in each of the parametric model group and the nonparametric model group, and selecting the optimum recovery model by setting weights for the plurality of recovery models based on the feature of the learning signal set X.

BRIEF DESCRIPTION OF THE DRAWINGS

The above and other objects, features and other advantages of the present system will be more clearly understood from the following detailed description taken in conjunction with the accompanying drawings, in which.

DETAILED DESCRIPTION

Figure 1:
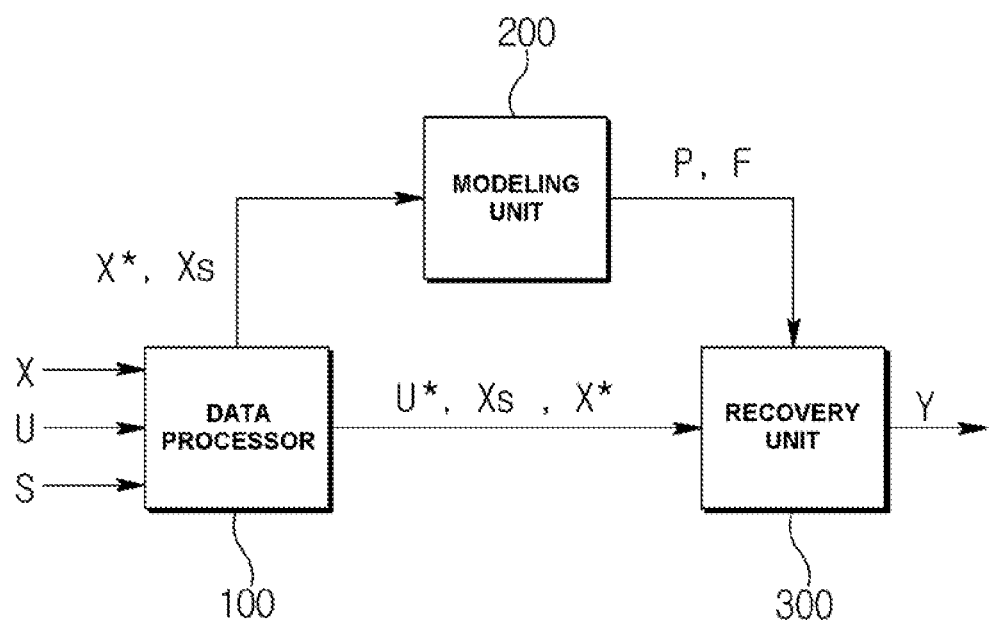
FIG. 1 is a block diagram illustrating a fault signal recovery system according to an embodiment of the present system.

The advantages and features of the present system and the manner of achieving the same will become apparent from the embodiments described in detail below with reference to the accompanying drawings. The present system may, however, be embodied in many different forms and should not be construed as limited to the embodiments set forth herein. It should be understood that these embodiments are provided such that the disclosure will be thorough and complete, and will fully convey the concept of the system to those skilled in the art. The scope of the system is only defined by the claims. Wherever possible, the same reference numerals will be used to refer to the same or like parts.

In addition, the embodiments disclosed herein will be described with reference to cross-sectional views and/or plan views which are ideal illustrations of the present system. In the drawings, the thicknesses of the films and regions are exaggerated for effective explanation of tire technical details. Thus, the shapes in the drawings may be modified according to manufacturing techniques and/or tolerances. Accordingly, the embodiments of the present system are not limited to the specific forms illustrated and rather include changes in shapes that are produced according to the manufacturing process. For example, the etching regions illustrated as being right-angled may be rounded or formed in a shape with a certain curvature. Thus, the regions illustrated in the drawings have schematic attributes, and the shapes of the regions shown in the drawings are intended to illustrate specific forms of regions of the elements and are not intended to limit the scope of the system.

FIG. 1 is a block diagram illustrating a fault signal recovery system according to an embodiment of the present system.

Referring to FIG. 1, the fault signal recovery system according to the present system may include a data processor 100, a modeling unit 200, and a recovery unit 300.

The data processor 100 may process a plurality of types of data to restore a fault signal. For example, the data processor 100 may process a signal set U including a fault signal, a learning signal set X including only normal signals, and an input S including information on a tag to be recovered. Specifically, the signal set X represents the learning data used to build an existing failure prediction model and may include only normal signals. The signal set U may be data including tags to be recovered, that is, tags related to fault signals. Some of the tags in the signal set U may be data containing fault signals and the learning signal set X may be learning data for restoring some tags including the fault signals included in the signal set U to normal signals. The input S may be an input containing information about tags to be recovered. In an embodiment of the present system, a tag may refer to a type of signal that may be measured in the plant. As an example, the tag may represent not only the signal types such as the differential pressure of an inlet filter, a turbine exhaust pressure and a temperature that may be directly acquired from a plant using sensors, but also a value such as output power that is calculated based on a signal acquired using a sensor in the system.

The data processor 100 may generate a first learning signal subset X*, a second learning signal subset Xs, and a signal subset U* upon receiving the learning signal set X, the signal set U, and the input S. The signal subset U* may include only signals obtained by removing some tags including the fault signal in an embodiment, and the first learning signal subset X* may include only signals obtained by removing tags disposed at positions corresponding to the some tags in an embodiment. That is, the first learning signal subset X* may include only signals corresponding to the tags other than the tags to be recovered in the learning signal set X.

The modeling unit 200 may be a module configured to generate a model for restoring a fault signal. The modeling unit 200 may receive the first learning signal subset X* and the second learning signal subset Xs generated by the data processor 100 and analyze the same. The modeling unit 200 may extract, from the first learning signal subset X* and the second learning signal subset Xs, feature information F including feature information and recovery information F about a plurality of recovery models usable for signal recovery.

The recovery unit 300 may estimate and recover a normal signal from the fault signal included in the signal set U based on the signal subset U*, the first learning signal subset X*, and the second learning signal subset Xs, which are received from the date processor 100, and the feature information F and the recovery information P, which are received from the modeling unit 200.

Figure 2:
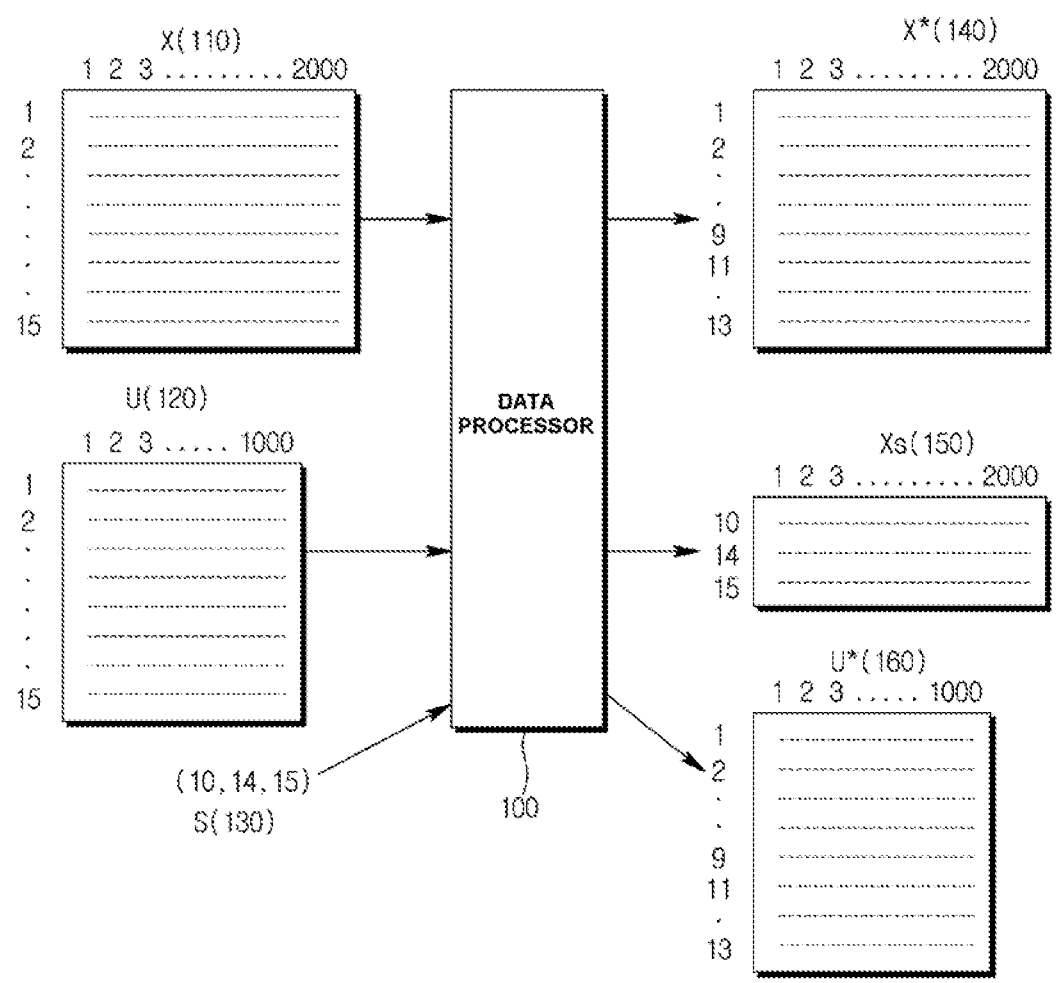
FIG. 2 is a block diagram illustrating a data processor according to an embodiment of the present system.

FIG. 2 is a block diagram illustrating a data processor according to an embodiment of the present system. FIG. 2 shows that the data processor 100 receives the learning signal set X, the signal set U, and the input S and generates the first learning signal subset X*, the second learning signal subset Xs, and the signal subset U*.

Referring to FIG. 2, both the input and the output of the data processor 100 may be presented in a matrix form. The learning signal set X (110) represents learning data used to construct an existing failure prediction model, and each row thereof may be a type of a signal measured in the plant, that is, a tag. Each column shows values of respective tags in temporal order. As an example, a signal may be acquired every five minutes through each sensor, and the acquired values may be presented in a column of tags. Then, the signal set X (110), which is a 15×2000 matrix, presents values acquired 2000 times (7 days in time) for each of the 15 signal types. Here, the signal set X (110) is a set conventionally used to construct the existing failure prediction model, and all values in the matrix may include normal values.

The signal set U 120 may be newly measured data. For example, one signal value may be acquired for 15 tags every 5 minutes during a period of about 3.5 days to generate the signal set U (120). As a result of the failure prediction performed based on the acquired signal set U (120), it is found that tags #10, #14 and #15 of the signal set U (120) are not normal signals. This issue may be raised because a fault has occurred in the plant, a sensor does not operate or there is a problem with a network for transmitting the observed signal value. A problem with a particular tag may be estimated from tire input S (130).

The signal set U (120) has normal signals for twelve tags out of the fifteen tags, but has fault signals for three tags. In this case, conventionally, the entirety of the signal set U 120 should be discarded, and the data collected for 3.5 days will disappear, which may lead to inefficiency in generating and executing a failure prediction model. In order to eliminate such inefficiency, the present system may restore a tag having a fault signal so as to obtain a normal signal and allow the signal set U (120) to be used tor learning data, thereby preventing waste of the collected data and enhancing efficiency of generation of a failure prediction model. That is, the signal set U (120) may be regarded as data including a fault signal, that is, a tag to be restored.

The input S (130) includes information on a tag that contains fault data and needs to be restored. In the example of FIG. 2, the tags #10, #14, and #15 among the tags of the signal set U (120) have fault signals.

The data processor 100 may receive the learning signal set X, the signal set U, and the input S and then generate the first learning signal subset X*, the second learning signal subset Xs, and the signal subset U*. The first learning signal subset X* (140) may include only signals corresponding to the remaining tags (hereinafter referred to as a second tag group) other than the tags to be restored in the signal set X (110). The signal subset U* (160) may include only signals corresponding to the second tag group in the signal set U (120). That is, a 12×2000 matrix formed by excluding the tenth, fourteenth, and fifteenth rows, which are the signal tags to be restored, from the learning signal set X (110), may become the first learning signal subset X* (140), and a 12×1000 matrix formed by excluding the tenth, fourteenth, and fifteenth rows, which are the signal tags to be restored, from the signal set U may become the signal subset U* (160). The second scanning signal subset Xs (150) may include only signals corresponding to the tags (first tag group) to be restored in the learning signal set X (110) That is, the second learning signal subset Xs (150) is a 3×2000 matrix having data of the tenth, fourteenth, and fifteenth rows. The first learning signal subset X*, the second learning signal subset Xs, and the signal subset U* output from the data processor 100 may be input to and used by the modeling unit 200 and the recovery unit 300.

While it is illustrated in the embodiment described above that the learning signal set X can be divided into the first learning signal subset X* and the second learning signal subset Xs by the data processor 100, a function may be performed in other parts of the fault signal recovery system using the learning signal set X that has not been processed by the data processor 100.

Figure 3:
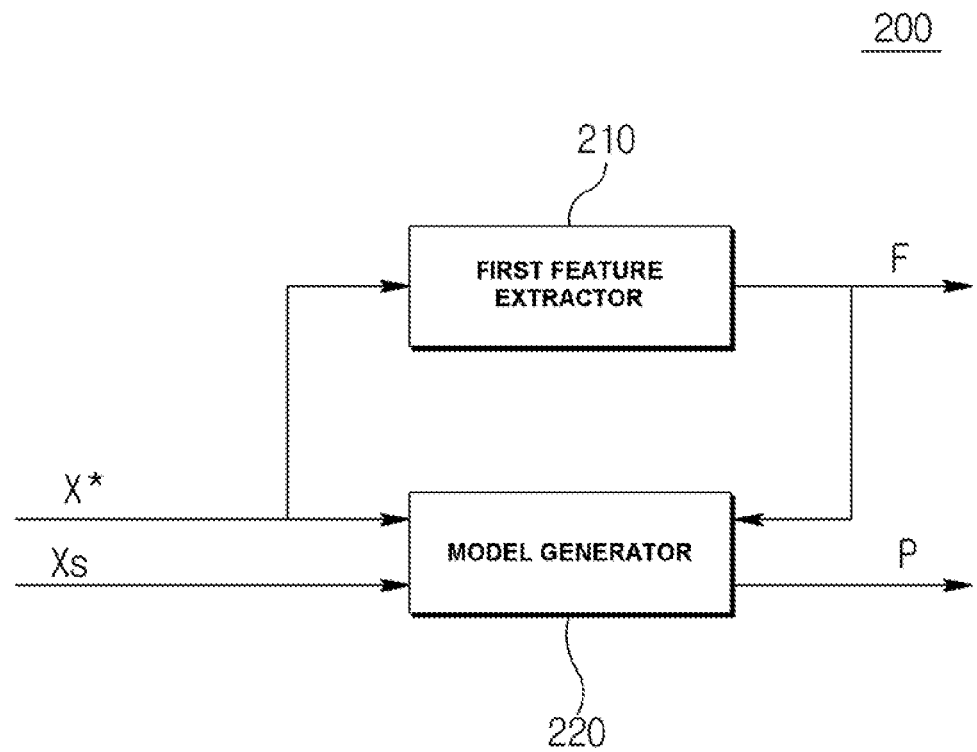
FIG. 3 is a block diagram illustrating a modeling unit according to an embodiment of the present system.

FIG. 3 is a block diagram illustrating a modeling unit according to an embodiment of the present system.

Referring to FIGS. 1 and 3, the modeling unit 200 may include a first feature extractor 210 and a model generator 220. The modeling unit 200 may function to generate a model for restoring a fault signal of the first tag group. The modeling unit 200 may receive the first learning signal subset X* and the second learning signal subset Xs generated by the data processor 100, and output feature information F including the feature information extracted from the subsets and recovery information P on a plurality of recovery models usable for fault signal recovery.

The first feature extractor 210 may extract features included in the data based on the first learning signal subset X*. The first feature extractor 210 may extract the features using only data of one specific tag or may extract the features by combining data of all the tags included in the first learning signal subset X* or data of some of the tags. In this case, the extracted feature information F may indicate whether an electric generator is in the starting state or is operating in a normal state, and may indicate whether the season in which the data is collected is spring, summer, autumn or winter. It may also indicate a specific weather. In addition, the first feature extractor 210 is not limited to the above-described examples, and may extract various features that may be obtained from the data generated in the plant.

The model generator 220 may generate a plurality of different models. These models may be nonparametric models or may be parametric models. That is, the model generator 220 may generate a plurality of nonparametric models and parametric models based on the feature information F extracted by the first feature extractor 210, using the first learning signal subset X* and the second learning signal subset Xs received from the data processor 100.

The parametric models may be models that represent the system using a finite number of parameters. That is, the parametric models may describe the system using a limited number of parameters. The parametric models may include a first principles based model, a transfer function model, and a state space model. Here, the first principles based model may be a model that uses factors determined according to the first law of physics, which is basic and fundamental, as parameters. The state space model may be a model that uses state variables as parameters. The transfer function model may be a model that uses variables defining a transfer function between input and output as parameters. Here, the transfer function model may include an ARX (Auto Regressive Exogenous) model, a NARX (Nonlinear Auto Regressive Exogenous) model, an FIR (Finite Impulse Response) model, and an ARMAX (Auto Regressive Moving Average with Exogenous) model.

The nonparametric models are models that can use an infinite number of parameters to represent a plant and may include a Non-Parametric Model (NPM), a Tree Model (TM), and a Neural Network Model (NNM). The nonparametric models may conceptually use an infinite number of parameters, but use only a finite number of models in reality.

The model generator 220 may determine parameters that optimize each of one or more parametric models and each of one or more nonparametric models using the first learning signal subset X* and the second learning signal subset Xs based on the features extracted by the first feature extractor 210. The parameters determined by the model generator 220 may be included in the recovery information P. The recovery information P may include a plurality of optimized parametric and/or nonparametric models and parameter information to be used in each recovery model. The recovery model may have been constructed according to a certain criterion (e.g., conditions at the time of operation of a power generation facility, an environment, etc.).

According to an embodiment of the present system, as the recovery information P on a plurality of recovery models is generated by the modeling unit 200 on the basis of the feature information F, reliability of recovery of the limit signals may be further enhanced.

Figure 4:
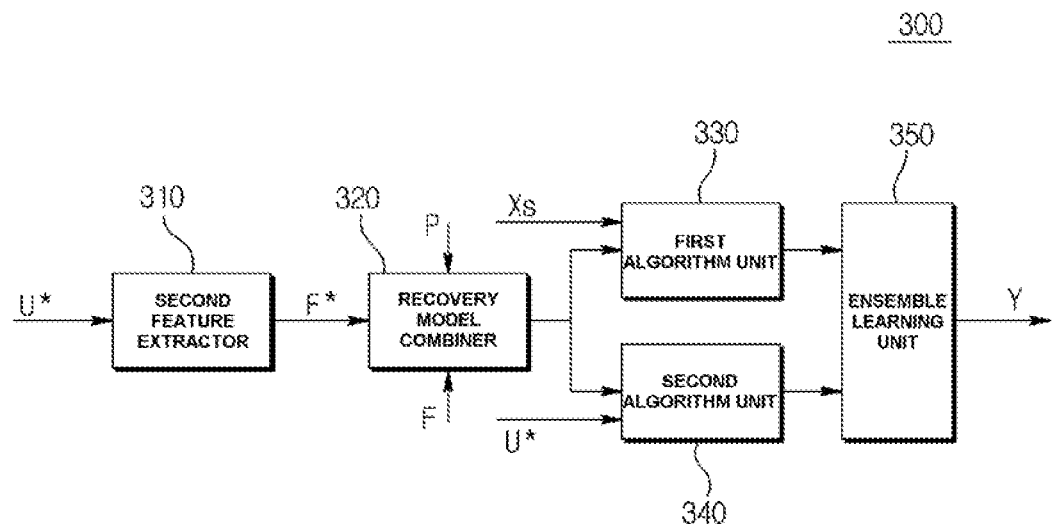
FIG. 4 is a block diagram illustrating a recovery unit according to an embodiment of the present system.

FIG. 4 is a block diagram illustrating a recovery unit according to an embodiment of the present system.

Referring to FIGS. 1, 3 and 4, the recovery unit 300 may estimate and recover normal signals for some tags including a fault signal, based on the signal subset U*, the first learning signal subset X*, the feature information F, and the recovery information P on the plurality of recovery models. The recovery unit 300 may include a second feature extractor 310, a recovery model combiner 320, a first algorithm unit 330, a second algorithm unit 340, and an ensemble learning unit 350.

The second feature extractor 310 may extract partial feature information F* included in the data of the signal subset U*. The criterion and logic of the feature extraction used by the second feature extractor 310 to extract features may be the same as the criterion and logic used by the first feature extractor 210 of FIG. 3.

The recovery model combiner 320 may select optimum recovery models to be used for recovery, based on the feature information F and the recovery information P, which are generated by the modeling unit 200, and the partial feature information F* on the signal subset U*, which is extracted by the second feature extractor 310. As an example, the recovery model combiner 320 may select at least one model in each of the set of nonparametric models and the set of parametric models. The recovery model combiner 320 may select optimum recovery models by setting weights for the selected recovery models. In selecting the optimum recovery models, the combiner 320 may compare the feature information F extracted by the first feature extractor 210 of the modeling unit 200 with the partial feature information F* extracted by the second feature extractor 310 of the recovery unit 300 to find similar regions and select recovery models that generate similar features in the similar regions as the optimum recovery models.

The first algorithm unit 330 may generate an algorithm-based recovery algorithm. The first algorithm unit 330 may generate the algorithm-based recovery algorithm by combining algorithms suitable for the optimum recovery models selected by the recovery model combiner 320. Through the algorithm-based recovery algorithm, the recovery unit 300 may maximize the expression capability of the recovery models and minimize the influence of data about a specific tag on data about the other tags. The algorithm-based recovery algorithm may be, for example, a k-Nearest Neighbor (k-NN)-based recovery algorithm.

The second algorithm unit 340 may generate a model-based recovery algorithm. The second algorithm unit 340 may generate the model-based recovery algorithm by combining algorithms suitable for the optimum recovery models selected by the recovery model combiner 320. Through the model-based recovery algorithm, the recovery unit 300 may overcome the disadvantage of the algorithm-based recovery technique and improve versatility. The model-based recovery algorithm may be, for example, a Multiple Linear Regression Model (MLRM)-based recovery algorithm.

Unlike the example described above, the first algorithm unit 330 may generate a parametric model-based algorithm, and the second algorithm unit 340 may generate a nonparametric model-based algorithm. However, the first algorithm unit 330 and the second algorithm unit 340 may generate recovery algorithms whose characteristics are different from each other. The first algorithm unit 330 and the second algorithm unit 340 may generate the recovery algorithms each having an advantage and a disadvantage.

The ensemble learning unit 350 may extract a plurality of recovery algorithms based on the recovery values determined by the first algorithm unit 330 and the second algorithm unit 340. Ensemble learning refers to using multiple learning algorithms to achieve better performance that when the algorithms are used separately. In the present system, a plurality of recovery models whose characteristics are different from each other and a plurality of recovery algorithms whose characteristics are different from each other are selected in order to increase the accuracy of the recovery values, and ensemble learning is used to estimate an optimum recovery value based on the recovery values estimated through the plurality of recovery algorithms. That is, the ensemble learning unit 350 may extract the advantages of each of the recovery algorithms extracted by the first algorithm unit 330 and the second algorithm unit 340, and supplement the disadvantages thereof to generate optimum recovery algorithms.

The ensemble learning unit 350 may use various algorithmic techniques to estimate the most accurate recovery value based on the recovery values estimated by the first algorithm unit 330 and the second algorithm unit 340. The algorithmic techniques may include bagging based on majority vote without multiplying each recovery value by a weight, or boosting for estimating the accurate value by multiplying a predicted value estimated by each prediction model by a weight and adding the weighted values.

Figure 5:
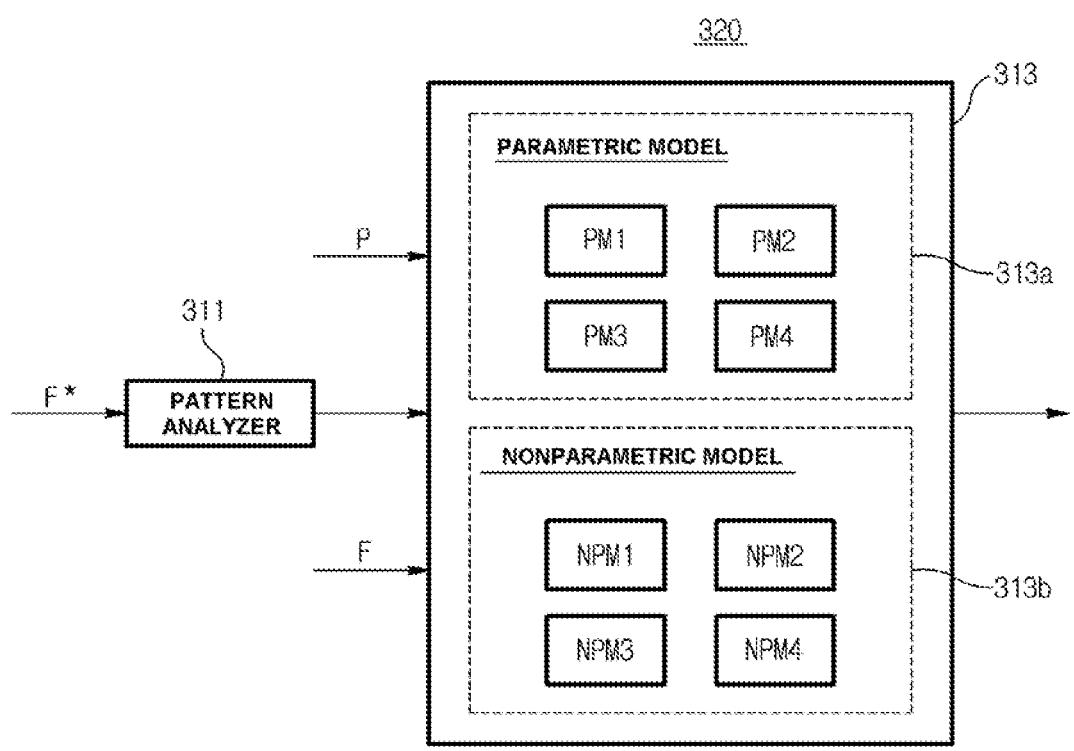
FIG. 5 is a block diagram illustrating recovery model combiner according to an embodiment of the present system.

FIG. 5 is a block diagram illustrating a recovery model combiner according to an embodiment of the present system.

Referring to FIGS. 1, 4, and 5, the recovery model combiner 320 may include a pattern analyzer 311 and a model selector 313. The recovery model combiner 320 may select an optimum recovery model by analyzing the features of the learning signal set X based on the feature information F and matching the features of the learning signal set X with the recovery models generated through the recovery information P. In this operation, a plurality of optimum recovery models may be selected. The recovery model combiner 320 may receive the feature information F on the learning signal set X and the recovery information P from the modeling unit 200.

The pattern analyzer 311 may analyze the features of the learning signal set X based on the feature information F and extract information thereon. The pattern analyzer 311 may pre-set the features of the information to be extracted. For example, the features may include temperature, humidity, and an amount of generated power. For example, the features of the learning signal set X may be the same as the feature information F extracted by the modeling/unit 200. The features of the learning signal set X and the information thereon extracted by the pattern analyzer 311 may be transmitted to the model selector 313.

The model selector 313 may include a first model selector 313a, which is a set of parametric models, and a second model selector 313b, which is a set of nonparametric models. The model selector 313 may select an optimum recovery model based on the features of the learning signal set X and the information thereon transmitted by the pattern analyzer 311. Specifically, the model selector 313 may select an optimum recovery model that matches the features of the learning signal set X among the recovery models generated through the recovery information P transmitted from the modeling unit 200.

For example, when the features of the learning signal set X are a temperature of 35° C., a humidity of 60%, and a generated power output of 100 MW, the model selector 313 selects a recovery model constructed based on the temperature of 30° C. to 40° C., the humidity of 50% to 70%, and the generated power output of 50 MW to 150 MW.

The recovery models may include at least one recovery model may be selected in each of the first model selector 313a and the second model selector 313b. The recovery models may be a recovery model selected in the first model selector 313a and a recovery model selected in the second model selector 313b or may include a plurality of recovery models selected in each of the first model selector 313a and the second model selector 313b. When a plurality of recovery models is selected in each of the first model selector 313a and the second model selector 313b, the model selector 313 may set weights for the recovery models selected in the same model selector.

For example, in the ease where the first model selector 313a selects two recovery models (a first recovery model and a second recovery model) and the second model selector 313b selects one recovery model, five model selector 313 may set a greater weight to one of the first recovery model and the second recovery model that is more similar to the features of the learning signal set X. When the model selector 313 determines that the features of the learning signal set X are more similar to the features of the first recovery model than to the features of the second recovery model, the model selector 313 may set the weight for the first recovery model to twice the weight for the second recovery model.

When a plurality of optimum recovery models is selected in each of the first model selector 313a and the second model selector 313b, the first algorithm unit 330, the second algorithm unit 340 and the ensemble learning unit 350 may generate an optimum recovery algorithm by selecting algorithms to be applied to the optimum recovery models based on the weights. Here, the algorithm to be applied may be matched with a recovery model assigned a greater weight in generating the optimum recovery models. That is, in order to select an algorithm to be applied to one optimum recovery model, the concept of weight used in generating an optimum recovery model may be used.

Figure 6:
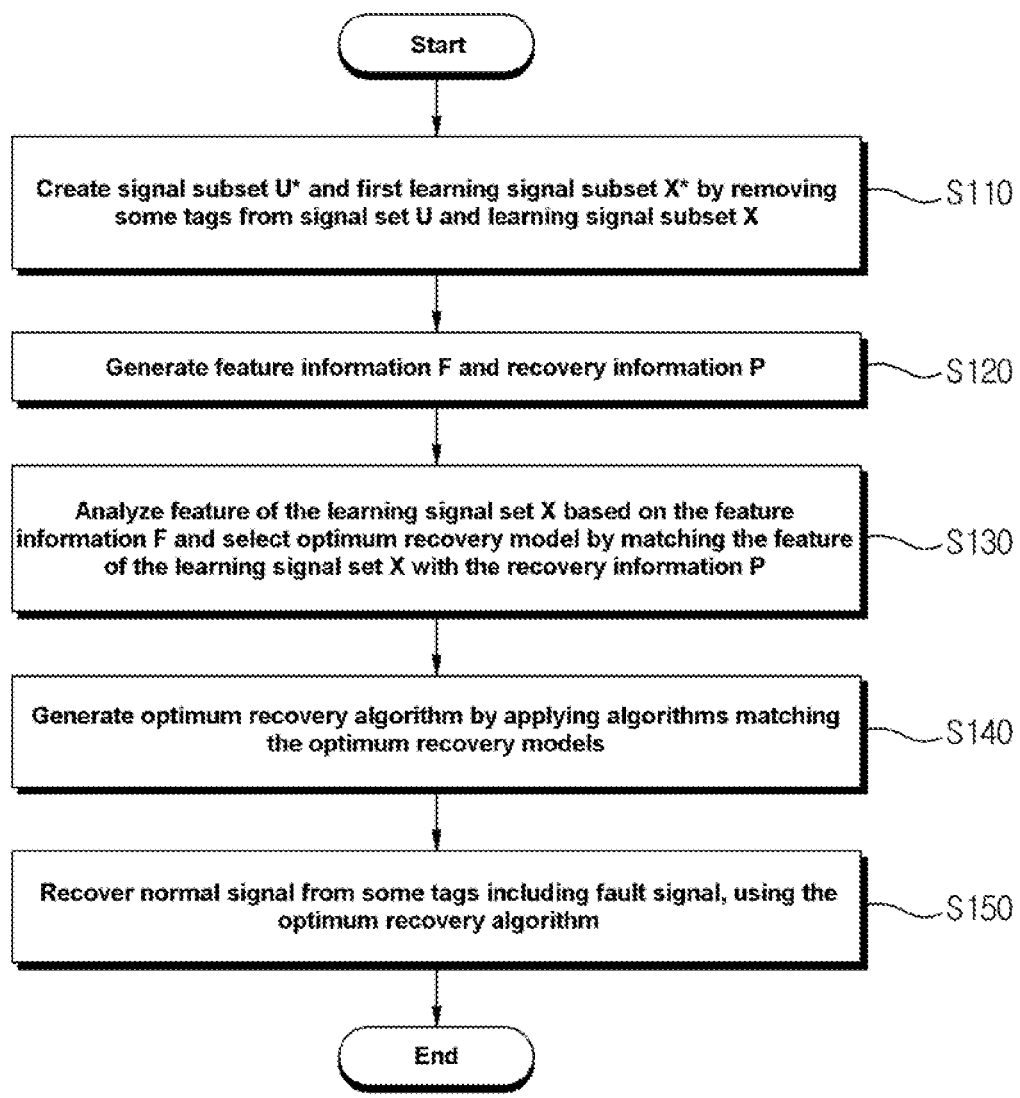
FIG. 6 is a flowchart illustrating a fault signal recovery method according to an embodiment of the present system.

FIG. 6 is a flowchart illustrating a fault signal recovery method according to an embodiment of the present system. For simplicity, redundant description will be omitted.

Referring to FIG. 6, the data processor may generate a signal subset U* and a first learning signal subset X* by removing some tags including a fault signal from the signal set U including the some tags and the learning signal set X including learning data for recovery. The data processor may additionally generate a second learning signal subset Xs including only signals corresponding to the some tags in the learning signal set X. The signals included in the first learning signal subset X* and the second learning signal subset Xs may all be normal signals (S110).

The modeling unit may extract feature information F from the first learning signal subset X* and output recovery information P on a plurality of recovery models that may be used for fault signal recovery. In this operation, the modeling unit may extract the feature information F using only data of one specific tag, or may extract the feature information F by combining the signals for all the tags included in the first learning signal subset X* or the signals for some of the tags. In addition, the modeling unit may generate the recovery information P on a plurality of recovery models that may be used for fault signal recovery, based on the feature information F, the first learning signal subset X*, and the second learning signal subset Xs (S120).

Thereafter, the recovery unit may generate optimum recovery models based on the feature information F and the recovery information P. The optimum recovery models may be generated by matching the features of the learning signal set X acquired from the feature information F with the recovery models generated through the recovery information P. Specifically, the optimum recovery models may be generated by selecting a plurality of recovery models matching the features of the learning signal set X (S130).

The optimum recovery models may be combined with matching algorithms. By applying the algorithms to the optimum recovery models, an optimum recovery algorithm may be generated. In addition, a recovery value for recovering a normal signal from some tags including a fault signal may be estimated through the optimum recovery algorithm. That is, the optimum recovery algorithm may be a combination of the recovery information P and a corresponding algorithm based on the feature information F (S140).

A signal for the some tags including a fault signal may be estimated as a normal signal through the optimum recovery algorithm. That is, the fault signal may be restored to the normal signal (S150).

As is apparent from the above description, according to embodiments of the present system, good-quality learning data may be generated by recovering a normal signal from a fault signal with higher accuracy using a fault signal recovery method with machine learning, and accuracy of failure prediction may be improved based on the generated learning data.

According to embodiments of the present system, an optimum recovery model may be generated by extracting the feature of data to be recovered and selecting a recovery model matching the feature of the data. In generating the optimum recovery model, the optimum recovery model having a high reliability may be selected by setting weights for recovery models based on the feature of the data to be recovered.

Although exemplary embodiments of the present system have been described with reference to the accompanying drawings, it will be apparent to those skilled in the art that the present system can be embodied in other specific forms without departing from the spirit and essential characteristics of the system. It is therefore to be understood that the above-described embodiments are illustrative and not restrictive in all aspects.

What is claimed is:

1. A fault signal recovery system comprising:
a data processor configured to receive a signal set U from sensors in a plant, where U includes one or more tags that are not normal signals and include a fault signal that is caused by one of an actual fault, a sensor error, and a transmission error, and wherein the one or more tags are to be restored to normal data when the fault signal is caused by a sensor error or a transmission error, an Input S comprising information on fault data in the one or more tags to be restored, and a learning signal set X comprising learning data comprising a plurality of tags when there are all normal signals acquired from the sensors and used to construct a failure prediction model;
wherein the data processor is configured to generate a signal subset U* by removing, from the signal set U the one or more tags that include a fault signal identified by the Input S including information on the one or more tags that contain the fault data to be restored to normal data, and to generate a first learning signal subset X* by removing from & the learning signal set X tags of the normal signals tags disposed at positions corresponding to the one or more tags that are not normal in signal set U, and wherein the data processor is further configured to generate a second learning signal subset Xs containing only signals for the one or more tags that are not normal and the first learning signal subset X* containing only signals for the remaining tags other than the one or more tags that are not normal by processing the learning signal set X;
a modeling device configured to receive the first learning signal subset X* and the second learning signal Xs, and wherein the modeling device is configured to use machine learning to generate feature information F extractable from the first learning signal subset X* and to generate recovery information P using X*, Xs, and F on a plurality of recovery models usable for restoring the fault signal; and
a recovery device configured to receive the signal subset U*, the first learning signal subset X*, and the second learning signal subset Xs, and wherein the recovery device is configured to analyze a feature of the learning signal set X based on the feature information F and wherein the recovery device is configured to use machine learning to select an optimum recovery model Y by matching the feature of the learning signal set X with the recovery models generated through the recovery information P to estimate and recover normal signals for the one or more tags that are not normal and to use the normal signals and the first learning signal subset X* as the learning data, and
thereby the system provides a fault recovery system with improved accuracy to recover the fault signal when the one or more tags that are not normal are sensor errors or transmission errors and wherein the learning signal set X can be updated with the signal set U and the recovered normal signals.

2. The fault signal recovery system according to claim 1, wherein the recovery device comprises:
a pattern analyzer configured to analyze the feature of the learning signal set X based on the feature information F and extract information on the feature;
a model selector configured to select the optimum recovery model matching the feature of the learning signal set X from among the recovery models generated through the recovery information P; and
an ensemble learning device configured to generate an optimum recovery algorithm by generating a recovery value for the one or more tags by selecting an algorithm matching the optimum recovery model.

3. The fault signal recovery system according to claim 2, wherein the optimum recovery model comprises at least one model selected in each of a parametric model group and a nonparametric model group.

4. The fault signal recovery system according to claim 3, wherein the model selector selects a plurality of recovery models in each of the parametric model group or the nonparametric group, and
wherein the model selector selects the optimum recovery model by setting weights for the plurality of recovery models based on the feature of the learning signal set X.

5. The fault signal recovery system according to claim 4, wherein the ensemble learning device selects an algorithm to be applied to the optimum recovery model based on the weights assigned to a plurality of recovery models, and
wherein the algorithm is matched with a recovery model that is assigned a greater one of the weights assigned for the recovery models in generating the optimum recovery model.

6. The fault signal recovery system according to claim 2, wherein the learning signal set X comprises a plurality of features, and
wherein the model selector selects a plurality of the recovery models matched with the features of the learning signal set X, respectively.

7. The fault signal recovery system according to claim 1, wherein the modeling device comprises:
a feature extractor configured to extract the feature information F extractable from the first learning signal subset X* received from the data processor; and
a model generator configured to generate the recovery information P on the plurality of recovery models usable for restoring the fault signal based on the first learning signal subset X* and the second learning signal subset Xs received from the data processor and the feature information F.

8. A fault signal recovery method comprising:
from receiving a signal set U comprising data from sensors in a plant for a plurality of tags, where U includes one or more tags that are not normal signals and include a fault signal that is caused by one or an actual fault, a sensor error, and a transmission error, and wherein the one or more tags are to be restored to normal data when the fault signal is caused by a sensor error or a transmission error, generating a signal subset U* by removing from the signal set U one or more tags that include a fault signal identified by an Input S comprising information on fault data in the one or more tags to be restored including information on the one or more tags that contain the fault data to be restored, and to generate a first learning signal subset X* by removing from a learning signal set X tags disposed at positions corresponding to the one or more tags and wherein the learning signal set X comprises learning data comprising a plurality of tags when there are all normal signals acquired from the sensors and used to construct a failure prediction model;

generating feature information F extractable from the first learning signal subset X* and to generate recovery information P using X*, Xs, and F on a plurality of recovery models usable for restoring the fault signal;

analyzing a feature of the learning signal set X based on the feature information F and selecting an optimum recovery model by matching the feature of the learning signal set X with the recovery models generated through the recovery information P;

estimating and recovering a normal signal for the some tags by applying an algorithm matching the optimum recovery model and using the normal signal and the first learning signal subset X* as learning data, and generating a second learning signal subset Xs containing only signals for the some tags and the first learning signal subset X* containing only signals for the remaining tags other than the some tags by processing the learning signal set X; and thereby the system provides a fault recovery method with improved accuracy to recover the fault signal when the one or more tags that are not normal are sensor errors or transmission errors and wherein the learning signal set X can be updated with the signal set U and the recovered normal signals.

9. The method according to claim 8, wherein the selecting of the optimum recovery model comprises:

selecting at least one recovery model in each of a parametric model group and a nonparametric model group and matching the same with the learning signal set X, the parametric model group and the nonparametric model group constituting the recovery information.

10. The method according to 8, wherein the selecting of the optimum recovery model comprises:

selecting a plurality of recovery models in each of the parametric model group or the nonparametric model group; and selecting the optimum recovery model by setting weights for the plurality of recovery models based on the feature of the learning signal set X.

11. The method according to claim 10, further comprising:

selecting an algorithm to be applied to the optimum recovery model based on the weights assigned to a plurality of recovery models, and wherein the algorithm is matched with a recovery model that is assigned a greater one of the weights assigned for the recovery models in generating the optimum recovery model.

12. A method of using data containing one or more fault signals as learning data comprising:

receiving a plurality data signals from a plurality of sensors in a plant once per a time period, wherein each data signal from each sensor is a tag;

adding the plurality of data signals to a learning signal set X when each of the tags is a normal signal;

receiving a signal set U from the sensors in the plant wherein U includes one or more tags that is not a normal signal and include a fault signal that is caused by one of an actual fault, a sensor error, and a transmission error, and wherein the one or more tags are to be restored to normal data when the fault signal is caused by a sensor error or a transmission error;

generating a signal set U* by removing from the signal set U the one or more tags that contain the fault data;

generating a first learning signal subset X* by removing from the learning signal set X tags of the normal signal tags corresponding to the one or more tags that are not normal in signal set U;

generating a second learning subset Xs containing only signals from the one or more signal tags that are not normal;

using a modeling device to receive X* and Xs to generate recovery information for restoring each fault signal of the one or more tags that are not normal;

thereby the method recovers normal data for the one or more tags that are not normal and updating the learning signal set X with the signal set U and the recovered normal signals.

* * * * *